United States Patent [19]

Kurzweil et al.

[11] Patent Number: 5,930,108
[45] Date of Patent: Jul. 27, 1999

[54] DOUBLE-LAYER CAPACITOR COMPOSED OF A PLURALITY OF INDIVIDUAL DOUBLE-LAYER CAPACITOR CELLS

[75] Inventors: Peter Kurzweil, Immenstaad; Ottmar Schmid, Markdorf; Hans-Jörg Heidrich, Ulm, all of Germany

[73] Assignee: Dornier GmbH, Germany

[21] Appl. No.: 08/897,532

[22] Filed: Jul. 21, 1997

[30] Foreign Application Priority Data

Feb. 7, 1997 [DE] Germany ............ 197 04 584

[51] Int. Cl.$^6$ ................ H01G 9/00; H01G 2/10
[52] U.S. Cl. ............ 361/502; 361/517; 361/530; 361/526; 361/535
[58] Field of Search .............. 361/502, 508, 361/511, 516–517, 518–519, 523, 525, 526, 528, 529–530, 532, 534–537; 204/291–294, 280

[56] References Cited

U.S. PATENT DOCUMENTS

| | | | |
|---|---|---|---|
| 5,136,474 | 8/1992 | Sarangapani et al. | 361/502 |
| 5,219,673 | 6/1993 | Kaun | 429/32 |
| 5,426,561 | 6/1995 | Yen et al. | 361/502 |
| 5,550,706 | 8/1996 | Kurzweil et al. | 361/502 |
| 5,555,155 | 9/1996 | Patel et al. | 361/503 |
| 5,557,497 | 9/1996 | Ivanov et al. | 361/502 |
| 5,568,353 | 10/1996 | Bai et al. | 361/523 |
| 5,621,607 | 4/1997 | Farahamandhi et al. | 361/502 |

FOREIGN PATENT DOCUMENTS

| | | |
|---|---|---|
| 0 590 366 | 9/1993 | European Pat. Off. . |
| 43 13 474 A1 | 11/1994 | Germany . |
| 02286122 | 10/1990 | Japan . |
| 03047582 | 2/1991 | Japan . |
| 04276511 | 9/1992 | Japan . |
| 06195950 | 7/1994 | Japan . |

OTHER PUBLICATIONS

Extended Abstracts B. 94/2, 1 Jan. 92, JOW, T.R. et al, "Hydrous Ruthenium Oxide as An Electrode Material for Electrochemical Capacitors".

Proceedings of the International Power Sources Symposium, Cherry Hill, NJ, Jun. 22–25, 1992, Symp No. 35, pp. 298–301 Laconti, A.B. et al.

Proceedings of the International Power Sources Symposium, Cherry Hill, NJ, Jun. 25–28, 1990, Symp No. 34, pp. 346–350 Oxley J.E.

*Primary Examiner*—Kristine Kincaid
*Assistant Examiner*—Anthony Dinkins
*Attorney, Agent, or Firm*—Evenson, McKeown, Edwards & Lenahan, P.L.L.C.

[57] ABSTRACT

A double-layer capacitor is composed of at least two individual double-layer capacitor cells connected in series, with bipolar electrodes and electrolyte layers being provided alternately. Each a bipolar electrode includes an electrically conducting carrier with an active layer applied on both sides, the active layer having a low resistance and large active surface. The carrier provides an electrically conducting barrier between the adjoining ion-conducting electrolyte layers, and the electrodes and electrolyte layers are permanently connected. An electrically conducting binder is integrated into the active layer, or a separate connecting layer is provided to promote adhesion between the active and electrolyte layers.

25 Claims, 8 Drawing Sheets

DOUBLE-LAYER CAPACITOR COMPOSED OF A PLURALITY OF INDIVIDUAL DOUBLE-LAYER CAPACITOR CELLS

BACKGROUND AND SUMMARY OF THE INVENTION

This application claims the priority of 197 04 584.7, the disclosure of which is expressly incorporated by reference herein.

The invention relates to an electrochemical double-layer capacitor composed of a plurality of individual double-layer capacitor cells. An individual cell comprises two electrodes connected in series as well as an electrolyte located between the electrodes, so that two capacitive electrode/electrolyte interfaces result.

PRIOR ART

Double-layer capacitors are known for example from German patent document DE 43 13 474, which describes comprehensively the principle and function of double-layer capacitors, referred to hereinbelow as DLCs. The subject of the present invention covers the design-specific aspects of a double-layer capacitor.

The double-layer capacitance and real surface of the electrode/electrolyte interface are proportional. For this reason, electrodes that have a BET surface are preferably used for DLCs. The roughness factor r that describes the ratio of the actual surface to the geometric surface is used to evaluate actual electrode surfaces.

The geometric surface and area-specific capacitance of the individual cells are important in designing DLCs. The following definition applies: area-specific capacitance=cell capacitance/cell cross section.

The following table sets forth the physical relationships which govern the design of DLCs:

TABLE 1

DESIGN EQUATIONS OF DOUBLE LAYER CAPACITOR

| Equation | Title | Calculation Formula |
|---|---|---|
| 1 | roughness factor | $r = \dfrac{A_{Rea.}}{A_{proj.}}$ |
| 2 | area-specific capacitance in [F/cm$^2$] | $c = \dfrac{C_{Zelle}}{A_{proj.}}$ |
| 3 | rated voltage $U_H$ [V] | $U_n = n_{zKon.} \cdot U_z$ |
| 4 | removable energy $\Delta W_{ab}$ [Ws] | $\Delta W_{ab} = \int_{t_1(U_1)}^{t_2(U_2)} P_{ab}(t) * dt$ |
| 5 | resistance of circuit [ohms] | $R = R_{Kon.} + R_L$ |
| 6 | resistance of capacitor [ohms] | $R_{Kon.} = n_{ZKon.} \cdot R_Z + R_{An.}$ |
| 7 | instantaneous power [W] | $P(t) = \dfrac{U^2(t)}{R}$ |
| 8 | specific energy [Ws/kg] | $\Delta w_{m,ab} = \dfrac{\Delta W_{ab}}{m_{Kan.}}$ |
| 9 | energy density [Ws/m$^2$] | $\Delta w_{v,ab} = \dfrac{\Delta W_{ab}}{V_{Kan.}}$ |
| 10 | specific instantaneous power [W/kg] | $\rho_{m,ab}(t) = \dfrac{U^2(t)}{R \cdot m_{Kan.}}$ |
| 11 | instantaneous power density [Ws/m$^3$] | $\rho_{v,ab}(t) = \dfrac{U^{2(t)}}{R \cdot V_{Kan.}}$ |
| 12 | instantaneous discharge current [A] | $I(t) = \dfrac{U(t)}{R}$ |
| 13 | ohmic power loss [W] | $\dot{Q}_{ad} = I_{ef}^2 \cdot R_{Kon.}$ |
| 14 | volume of active bodies [m$^3$] | $V_K = A_{EZ} \cdot [n_{ZK}(d_{Ely.} + d_{EL}) + d_{EL}]$ |
| 15 | weight of active bodies [kg] | $m_K = \rho_K \cdot V_K$ |
| 16 | capacitance of capacitor [F] | $C_K = \dfrac{A_{EZ} \cdot c}{n_{ZK}}$ |
| 17 | energy density of active bodies [Ws/m$^3$] | $\omega_{v,ab} = \dfrac{\frac{1}{2} c \cdot U_{EZ}^2}{(d_{Ely} + d_{El})}$ |
| 18 | specific energy of active bodies [Ws/kg] | $w_{m,ab} = \dfrac{\frac{1}{2} c \cdot U_{EZ}^2}{(\delta_{Ely} \cdot d_{Ely} + \delta_{El} \cdot d_{El})}$ |

| Meaning | Symbol | Meaning | Symbol |
|---|---|---|---|
| real surface, interface electrode/electrolyte | $A_{Rea.}$ | geometric surface | $A_{proj}$ |
| cell capacitance | $C_{Zelle}$ | number of cells in capacitor | $n_{Z.Kon.}$ |
| voltage of one cell | $U_Z$ | instantaneous discharge voltage | $U(t)$ |
| voltage level 2 of capacitor | $U_2(t)$ | voltage level 1 of capacitor | $U_1(t)$ |
| internal resistance of capacitor | Kon. | load resistance | $R_L$ |
| cell resistance | $R_Z$ | connecting resistance | $R_{An.}$ |
| weight of capacitor | $m_K$ | volume of capacitor | $V_{Kon.}$ |
| effective value of capacitor current | $I_{eff}^2$ | volume of active body of capacitor | $V_K$ |
| thickness of electrolyte layer | $d_{Ety}$ | thickness of electrode | $d_{El}$ |
| weight of active body of capacitor | $m_K$ | density of active body of capacitor | $\rho_K$ |
| capacitance of capacitor | $C_{Kon}$ | density of electrolyte layer | $\delta_{Ely}$ |
| density of electrode | $\delta_{El}$ | | |

The design and connection of the individual double-layer capacitor cells also play an important role in the production of compact and high-performance double-layer capacitors. The relationships listed in Table 2 (below) serve to optimize size and weight. Basically, the internal resistance of a DLC must be made considerably smaller than the consumer resistance in order to be able to deliver a high level of power to the consumer.

Similarly, the size- or volume-related power (specific power or power density) is obtained from the relationship $P=U_2/R$ (See Equations 10, 11 in Table 1 above)

The maximum charging voltage of an individual cell of a capacitor is determined by the decomposition voltage of the electrolyte. The double-layer capacitor must be operated below the decomposition voltage to avoid irreversible damage. The maximum permissible operating voltage of the DLC is determined by the number of individual cells connected in series electrically, and the total of the individual cell voltages. (See Equation 3, Table 1).

On the basis of the design equations in Table 1, the following goals and/or requirements for the design parameters can be derived:

TABLE 2

DESIGN CRITERIA

| Part/Assembly | Principal Requirement | Purpose of the Requirement |
|---|---|---|
| electrolyte layer | • thin, high ion conductivity, porous, absorbent | • lower internal resistance of the capacitor, compact design |
| electrode carrier | • high electrical conductivity, good adhesion properties for the active layer | • low internal resistance of the large actual electrode/electrolyte surface<br>• active layer with good adhesion on electrode carrier |
| active layer | • high BET surface, high electrochemical activity<br>• good adhesion to electrode carrier<br>• high cyclic stability, high conductivity, high capacitance | • high area-specific capacitance<br>• high short-circuit resistance (low residual current)<br>• long service life |
| electrical contact | • low contact resistance between individual layers<br>• no current gradients | • low internal resistance of capacitor |
| seals | • low space and weight requirement<br>• simple and reliable design<br>• inexpensive and readily available | • high specific power data<br>• long service life<br>• electrolyte protected against leakage |
| capacitor housing | • low space and weight requirements<br>• possible hermetic seal | • contribution to achieving high performance data |
| current connections | • homogeneous current flow in and out<br>• low space and weight requirements<br>• simple and reliable design | • avoidance of "hot spots" and provision of high area-specific capacitor capacitances<br>• contribution to achieving high performance data long service life |
| assembly | • simple and reproducible assembly | • assembly cost and low failure rates |
| operating safety | • simple design of components; risk-free operation | • compliance with high safety engineering standards, simple operation |

The ohmic resistances of DLCs produce a heat flux when electrical current is supplied to them (charging) and when they deliver current (discharging). This heat flux must be removed appropriately by suitable design measures to avoid overheating and consequent destruction of the DLC. The ohmic losses of DLCs that consist of individual cells connected in series are composed of the ohmic losses of the electrical incoming and outgoing leads on the capacitor and of the resistances of the cells. Equation 6 in Table 1 applies to identical cells in a capacitor.

Since the electrode materials used are good conductors, the cell resistance is determined primarily by the resistance of the electrolyte layer and by the contact resistances. Because of the internal resistance, an ohmic power loss $P=1(t)^2R$ is produced that must be removed efficiently. (See Equation 13, Table 1). Depending on the application, active cooling (by water or air) or passive cooling (free convection) must be provided over a large exchange surface.

As in the case of the familiar electrolytic capacitor, the service life of a DLC depends to a large degree on operating temperature. As the operating temperature increases, the vapor pressure of the electrolyte rises and vapor diffusion through the sealing surfaces to the environment increases as well. This results in irreversible concentration or decomposition of the electrolyte and eventually renders the DLC useless. The highest vapor leak flows take place through the seals that separate the interior of the cell hermetically from the environment because the vapor permeation rate is much higher there than in the other DLC components. For the reasons given above, the sealing concept of the DLC is of primary significance.

Finally, the only double-layer capacitor technology that makes sense is one that provides the required power data most economically, reliably, and safely, and has a compact design.

Known double-layer capacitors, as described for example in the Journal of Power Sources 60 (1996), pages 219–224, suffer from the following disadvantages (FIG. 1):

1. Problem of sealing the electrolyte chamber and connecting individual cells in series.

If each individual cell is sealed (by a flat seal for example) the system will have a high manufacturing and assembly cost. A risk from the safety engineering standpoint develops in a stack if the decomposition voltage of the electrolyte is exceeded in one or more cells because of inhomogeneous capacitor voltage distribution for example, and gas develops. The pressure thus generated can cause the seal on the housing to burst and can destroy the cell.

A malfunction of only one individual cell can render the entire DLC useless. The function of the capacitor can be restored following painstaking identification of the defective cell and disassembly of the capacitor into its individual cells and individual cell components.

Service life is also limited by the rate at which the electrolyte layer dries out as a function of the operating conditions (temperature, operating cycle, etc.). This is caused by diffusion of water vapor through the seals and through the interfaces between the seals and the sealing body. Known sealing concepts that provide a seal for each individual cell suffer from losses due to leakage, which cannot be reversed without disassembling the DLC into its individual cells.

Service life is also limited by stacking seals between the electrodes. There is a pressure distribution along the compressed stack that causes temperature-dependent continuous plastic deformation of the seals. These processes must be offset by a costly design of the stack-compressing device (cup springs for example). In a stack that contains more than approximately fifty individual cells, the large number of deformable seals arranged sequentially in the cells complicates the required constant compression of the stack (even with cup springs).

2. Problem of electrical contacts between cells and cell blocks.

The DLC's known heretofore were built up by loosely stacking the individual cells and individual cell elements (bipolar electrodes, electrolyte, seals), as shown in FIG. 1, which results in high contact resistances between the stacked components, adversely affecting the internal resistance of the capacitor.

3. Problem of assembly and repair

The large number of capacitor elements results in high assembly cost and high failure rates. A capacitor composed of a plurality of individual cells cannot be repaired.

In known DLC'S, such as those described for example by NEC, PANASONIC, ASHAHI, PINNACLE, MAXWELL, GINER, EVANS ALCATEL, DANIONICS, etc. these problems have either not been solved or have been partially circumvented by using individual cells rated at only a few volts instead of a bipolar cell arrangement composed of a large number of individual cells with a high total voltage.

One object of the present invention is to provide an operationally safe double-layer capacitor that can be repaired, does not suffer from the disadvantages described above, and simultaneously delivers high performance (energy density and power density) during a long service life.

Another objection of the invention is to make it possible to repair a large DLC that has a high production cost.

These and other objects and advantages are achieved by the double-layer capacitor according to the invention, which comprises at least two individual double-layer capacitor cells. (See for example the schematic diagram in FIG. 2b.) Alternate bipolar electrodes 4 and electrolyte layers 5 are provided. No additional layers are required between the electrodes and electrolyte layers (for example sealing layers for the electrolytes or separate ion barrier layers that also separate the cells). This means that the individual cells and individual cell elements (electrodes, electrolyte) are in a permanent mechanical relationship with one another. For this purpose, an electrically conductive binder is integrated into the active layer of the electrode or a separate connecting layer 3 is provided to promote the adhesion of the active and electrolyte layers.

As shown in FIG. 2a, electrode is produced by applying active layer 2 with a large surface, low resistance, and high capacitance so that it adheres permanently to a thin carrier layer 1, which is a good electrical conductor, mechanically stable, macro-, meso-, and/or microporous, and thermally and chemically stable. The carrier layer serves as the electrically conducting barrier between adjacent ion-conducting layers.

Advantageous embodiments of the invention contain the following additional features:

Stacking the electrodes and electrolyte layers to form a stack with a larger number (much greater than two) of individual cells. As an alternative, a stack that comprises only a few individual cells (two individual cells for example) can be arranged helically, loopwise, or along a winding course.

Embedding the active unit in a hermetically sealed or largely gas-impermeable housing.

Installation of leads to conduct electrical current in and out with low ohmic losses.

Providing for sufficient heat removal to avoid destruction of the component by overheating.

Providing a plurality of DLCs to achieve high voltage ratings and a high capacitance for the entire circuit.

Other objects, advantages and novel features of the present invention will become apparent from the following detailed description of the invention when considered in conjunction with the accompanying drawings.

BRIEF DESCRIPTION OF THE DRAWINGS

FIG. 9b is a perspective view of the double layer capacitor of FIG. 9a.

DETAILED DESCRIPTION OF THE DRAWINGS

1. Electrolyte Layer 5

Figure 1:
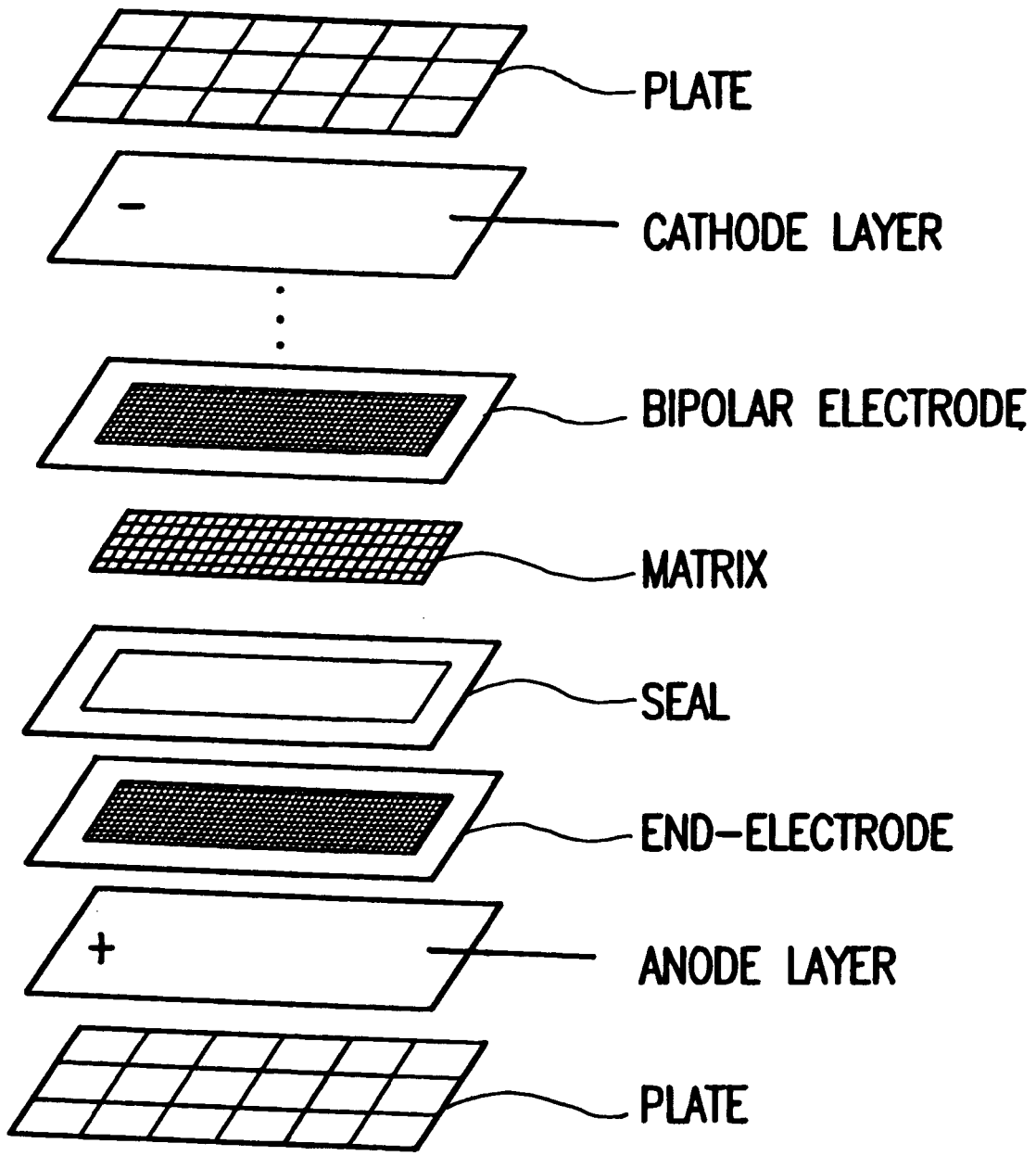
FIG. 1 shows the design of a double-layer capacitor according to the prior art.

The invention relates in particular to DLCs with solid, pasty, or gel-like electrolytes that have a high ionic conductance.

The electrolyte layer must be made so that there is no electron-conducting contact between the electrodes. Embodiments are as follows:

Solid electrolyte such as ion- or proton-exchange membranes (for example Nafion® or GORE Select® ). Gel-like proton-conducting materials applied to the carrier are also suitable.

So-called solid electrolytes that have a pasty or gel-like structure and are processed for example with a binder and liquid electrolytes to form a paintable paste. To avoid a short circuit through the electrolyte layer when the distance between the electrodes is very small, it is also advantageous to integrate gas-permeable spacers (such as netting or fabric for example) into the electrolyte layer.

2. Carrier Layer 1

The carrier layer has the task of providing a cross-sectional area that is as large as possible for the active layer applied to both sides, as well as an ion-conducting barrier between the adjoining electrolyte layers to ensure mechanical, thermal, chemical, and electrochemical stability. Porous or dense layers or combinations thereof are basically suitable for this purpose. When using porous layers, assurance must be provided that ion conduction does not take place through the carrier and that there is no electrical connection between the active layers. These problems are solved by hydrophobization of the porous supports before the active layer is applied. Possible carrier layers include dense metallic layers (metal foils or porous metallic layers such as netting, fabric, foam, fleece, paper, etc.) as well as tight nonmetallic layers (such as conductive plastic films, graphite films, or porous layers such as graphite paper and carbon paper, for example).

3. Active Layer 2

The active layer is applied to both sides of the carrier layer and/or on the electrolyte layer. The active layer consists of an electrically conducting electroactive material such as hydrated and incompletely oxidized metal oxides of ruthenium, iridium, tantalum, palladium, platinum, and titanium and mixtures thereof. Additional advantageous designs include mixtures of metal oxide(s) and a filler such as carbon black or graphite for example that produce a large surface and thus also contribute to reducing the metal oxide coating. The active layer is applied by heat treatment so that it adheres to the carrier or electrolyte layers, or an adhesion promoter is added to the mixture. Adhesion promoters that can be used include polymers and inorganic or organic binders. Nafion® solutions have proven to be advantageous below approximately 200° C. PTFE suspensions are used for active layers that are applied at higher temperatures (up to 500° C.). Other advantageous adhesion promoters include "thick oil" and organometallic compounds. Thick oil is an intermediate product of paint manufacture.

4. Connecting Layer 3

If serious adhesion problems develop between the active and carrier layers, a connecting layer can be applied. It is electrically conducting, can be made discontinuous or continuous, and promotes adhesion between the electrode and electrolyte layers. Possible connecting layers include conductive metal-resin mixtures, and paints as well as Nafion® solution configurations.

A suitable carbon-containing adhesive layer is also produced by the thermal decomposition of organic compounds such as sugars, fats, or products of agricultural origin (milk). A powdered preliminary stage of the active layer, metal oxide powder for example, mixed with the organic product, is applied to the carrier by painting, dipping, or pressing, and then thermally decomposed under the influence of heat.

5. Bifunctional Connecting Layer

The bifunctional connecting layer guarantees the adhesion of the active layer to the carrier, and simultaneously to the electrolyte layer. It is the reason for the compact mechanical and inseparable connection of the unit according to the invention, such connection also being a good electrical conductor.

6. Overall Design of the Double-Layer Capacitor

Figure 3A:
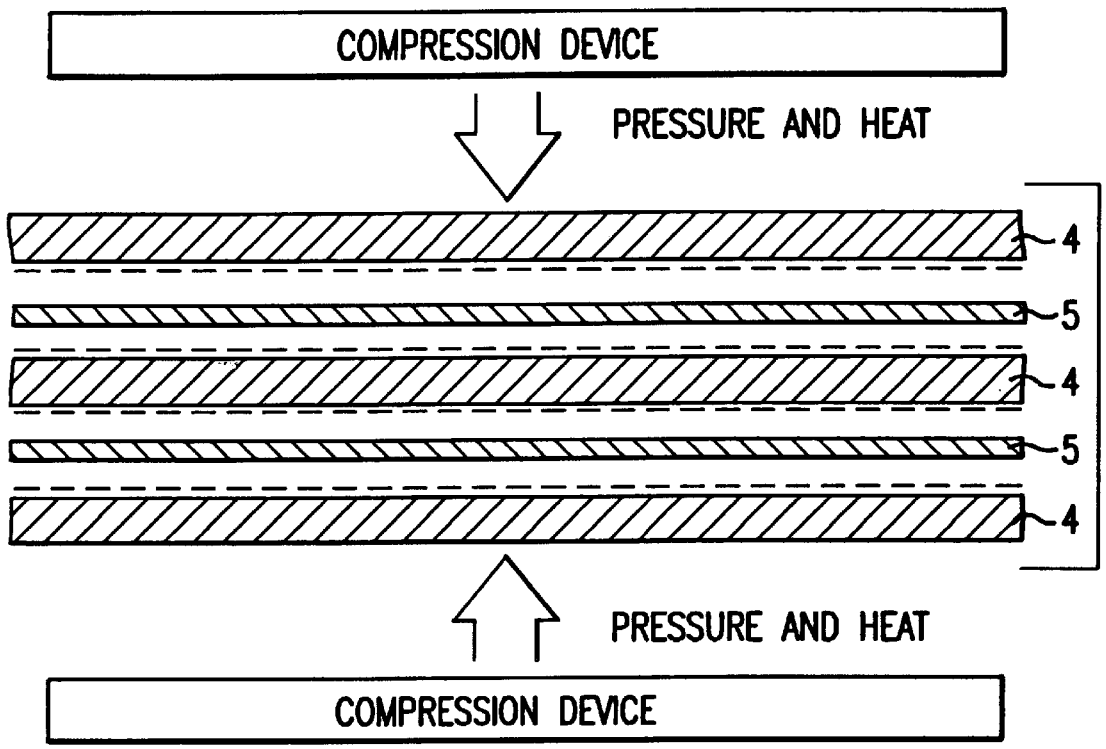
FIG. 3a shows the manufacture of a double-layer capacitor according to the invention.
Figure 3B:
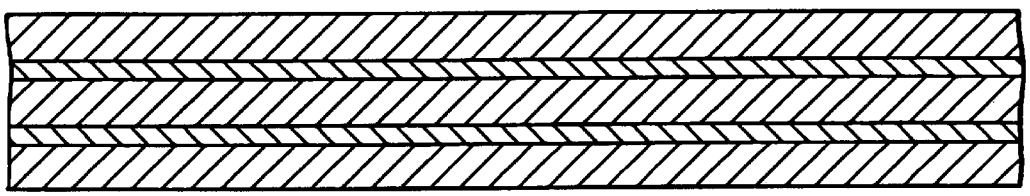
FIG. 3b shows the structure of an assembled double layer capacitor.

The double-layer capacitor comprises at least two individual double-layer capacitor cells and is arranged in advantageous embodiments as a wound-up band or stack. A sketch of the manufacturing process appears in FIGS. 3a, and 3b in which the capacitor elements/components are provided alternately with bipolar electrode layers 4 and electrode layers 5. The uppermost and lowermost layers are electrodes that abut the electrolyte layer on one side. The connection between the electrode and electrolyte layers is created by the following mechanisms:

Case a)

Figure 2A:
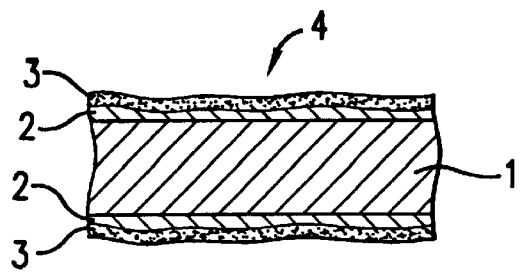
FIG. 2a is a cross sectional view of an electrode of the double layer capacity according to the invention.
Figure 2B:
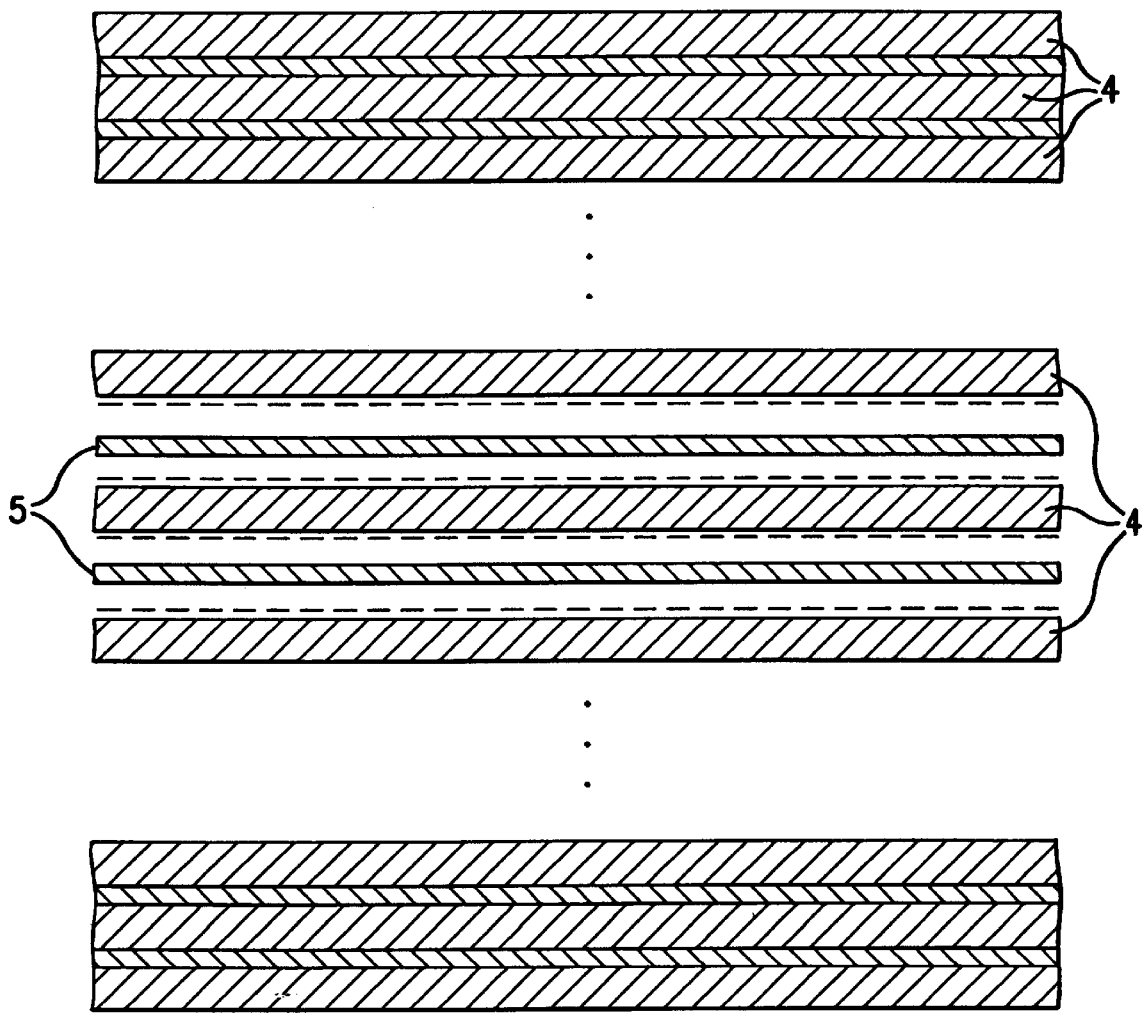
FIG. 2b is a partially exploded view of a double-layer capacitor according to the invention as a stack of bipolar electrodes and electrolyte layers.

A permanent connection between electrode 4 and electrolyte layer 5 is produced by the adhesive action of connecting layer 3 (FIGS. 2a and 2b). Compression devices in this situation primarily serve only for homogenous stacking of the layers.

Case b)

A permanent connection is created by means of the adhesive effect of the connecting layer in conjunction with pressure and/or tempering of the components to be joined (by a hot press or hot roller for example).

Case c)

By eliminating the connecting layer, a bond can be produced by the binder in the active layer whose purpose is to guarantee permanent adhesion to the carrier layer.

Case d)

By analogy with Case c) but as a result of the application of pressure and/or heat, a permanent connection is produced between the electrode and the electrolyte layer.

EXAMPLES

Figure 4:
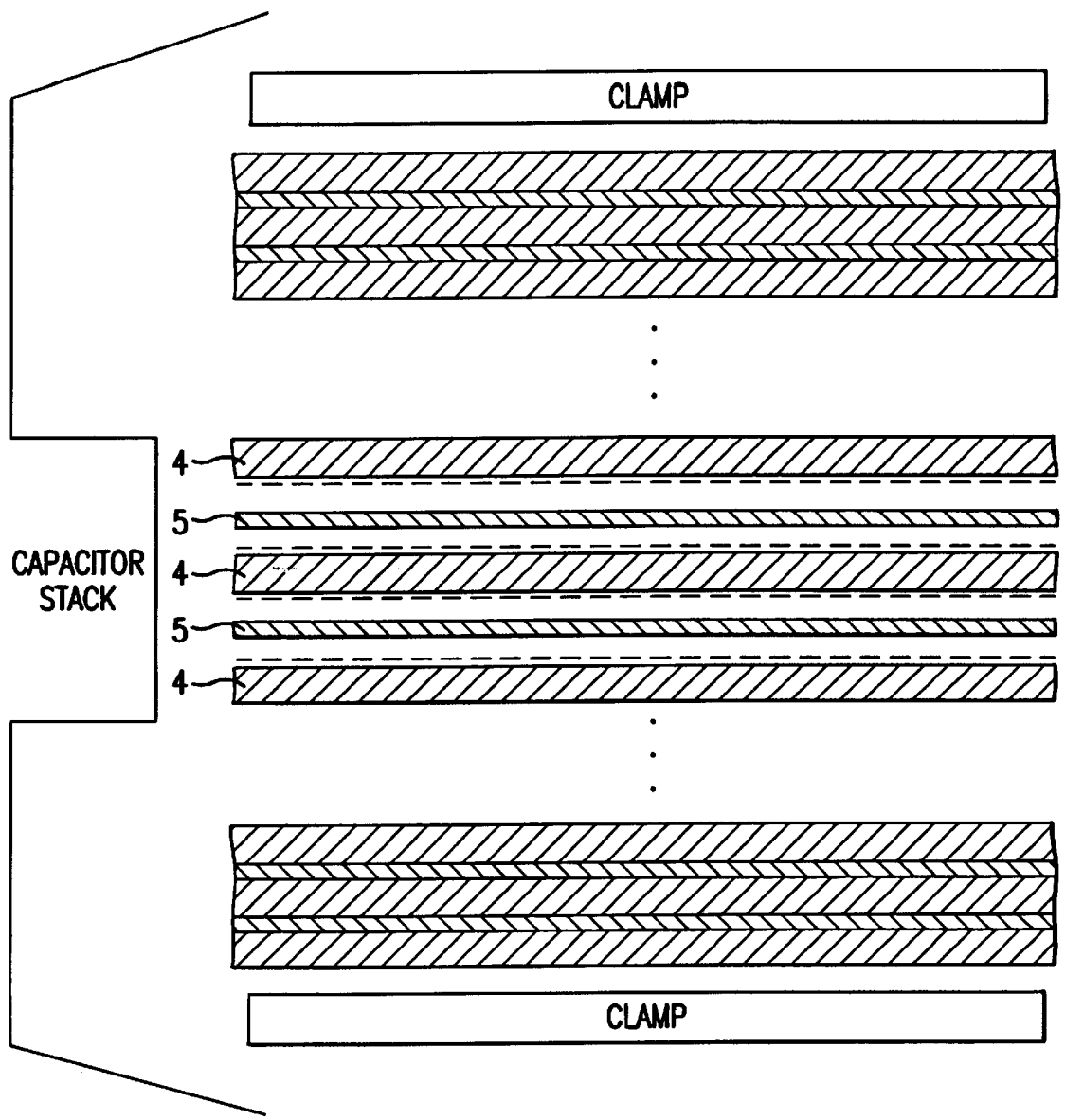
FIG. 4 is a partially exploded view of a double-layer capacitor according to the invention with a stacked design.

Stack Design (FIG. 4)

Stack designs are advantageously used when there is high capacitor voltage and high capacitance. To produce a stack, the capacitor elements (bipolar electrode 4, electrolyte layer 5) are placed on one another and located inside a clamping device, a flange for example. According to the invention, the individual capacitor elements are connected with one another.

Embodiment A

Carrier Layer: A porous carbon paper or dense carbon paper with a carbon binder.

Active Layer: A metal oxide in the form of a hydrated incompletely oxidized powder, such as for example is disclosed in German patent document DE 43 13 474.

Connecting Layer: Produced by the application of Nafion® solution to the active layer.

Electrolyte Layer: A proton-exchange membrane such as Nafion® or GORE Select® as well as gel-form proton-conducting material.

A stack is produced that has an alternate arrangement of electrodes and electrolyte layers, with the outer layer consisting of an electrode coated on one side that faces the electrolyte layer.

The connection is advantageously produced by a hot press, with the application of pressure and temperature followed by cooling of the bond. When proton-exchange membranes are used, it is advantageous to use hot-press temperatures greater than 100° C. and a press pressure of more than 1 bar.

Embodiment B

Carrier Layer: A dense carbon paper film, approximately 40 $\mu$m thick for example.

Active Layer: A metal oxide in the form of a hydrated, incompletely oxidized powder, such as disclosed, for example, in German patent document DE 43 13 474.

Connecting Layer: A Nafion® solution.

Electrolyte Layer: A proton-exchange membrane (approximately 40 $\mu$m thick).

The coating process and production of the bond are performed similarly to Embodiment A.

The limited thickness of the bonded unit (and hence the high energy and power density that can be achieved) are advantageous.

Embodiment C

Carrier Layer: A dense metal foil, approximately 40 μm thick for example.

Active Layer: A metal oxide.

Connecting Layer: A solid bond between the fabric and the carrier layer, produced by an etching process.

Electrolyte Layer: A paintable paste integrated into a fabric (approximately 50 μm thick).

The paste consists of sulfuric acid and aluminum oxide and the fabric is made of zirconium dioxide-polysulfone.

After the electrode-electrolyte elements have been assembled, the resultant stack is compressed under the influence of temperature. The pasty nature of the electrolyte allows sealing of the electrolyte chambers to be eliminated.

Embodiment D

The carrier is a metal foil or a graphite foil.

A porous carbon fabric is placed on top and the whole structure is coated with the metal oxide, then fixed with Nafion® solution, and the PEM solid electrolyte is applied. Several of these units are stacked and compressed to form a bonded unit under the influence of pressure and heat.

Housing and Electrical Contacts of a Stacked Capacitor

Figure 5:
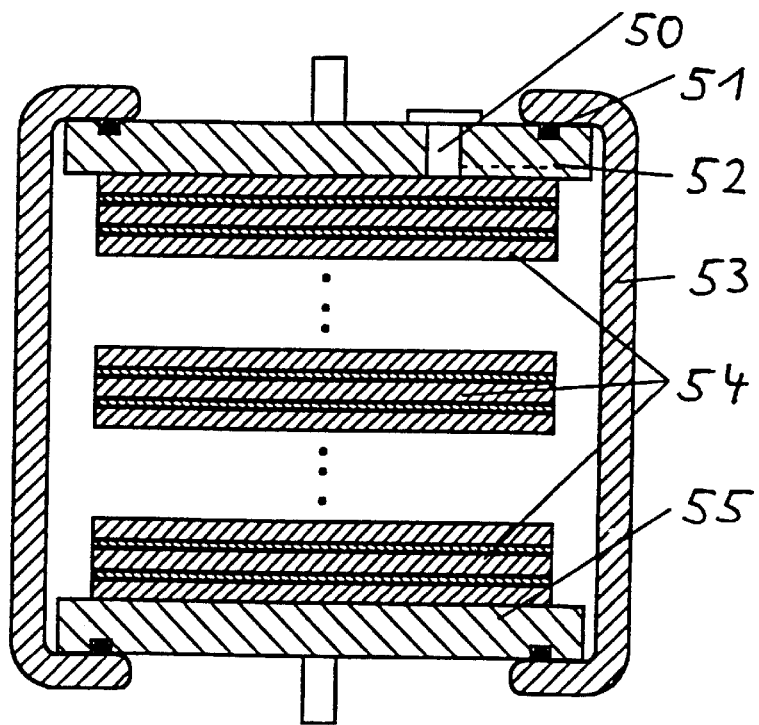
FIG. 5 shows a double-layer capacitor according to the invention using the stack design and with a crimped housing.

The stack comprises at least two individual capacitor cells and can be provided with electrical leads and compressed as follows:

a) End Plate Design (FIG. 5)

Figure 6:
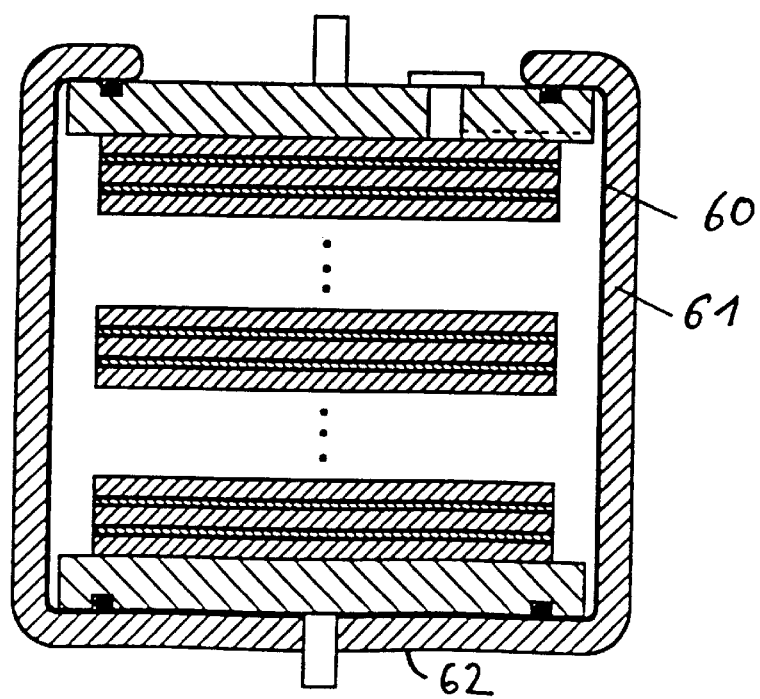
FIG. 6 shows a double-layer capacitor according to the invention using the stack design and with the housing in the form of a sleeve.

Two flange plates 52, 55, pressed mechanically onto stack 54 by a crimped housing 53, create electrical contact with the stack. Seals 51 on the crimped housing provide a hermetic seal. A burst protector or overpressure valve 50, mounted on flange 52 serves as protection against overpressure in the event of a malfunction that leads to gas formation.

b) Can Design (FIG. 6)

The stack is integrated into a sleeve 61 with a lid 62. The sleeve can be made of plastic or metal. In the latter case, an electrically insulating layer 60 is provided on the inside wall of the sleeve. The stack, as in the end plate design described above, is located between two flanged plates, with one flange plate resting on lid 62 of the sleeve and the other being connected to the sleeve by crimping. The electrical contacts are formed by the flange plates.

Figure 7:
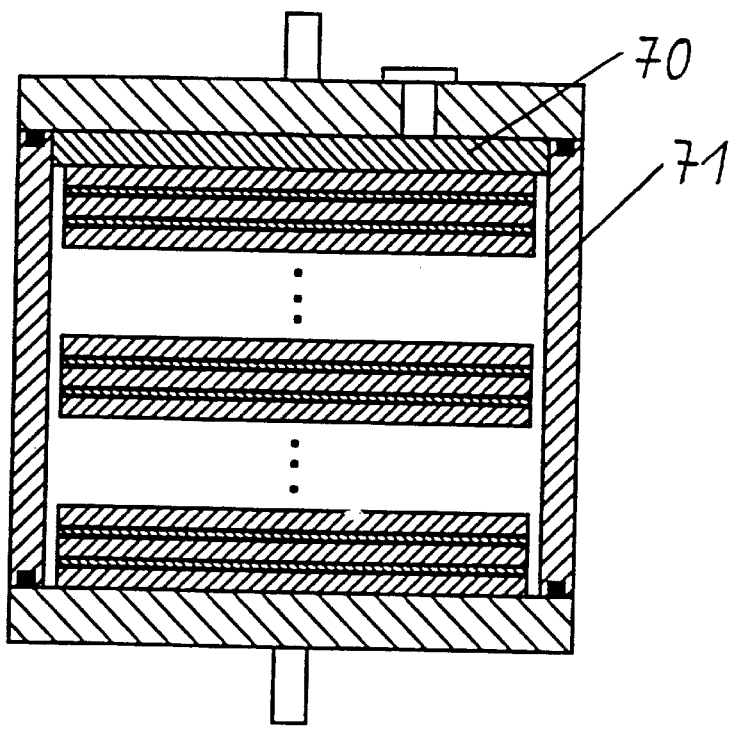
FIG. 7 shows a double-layer capacitor according to the invention using the stack design with the housing in the form of a tube as well as a pressure buffer.
Figure 8:
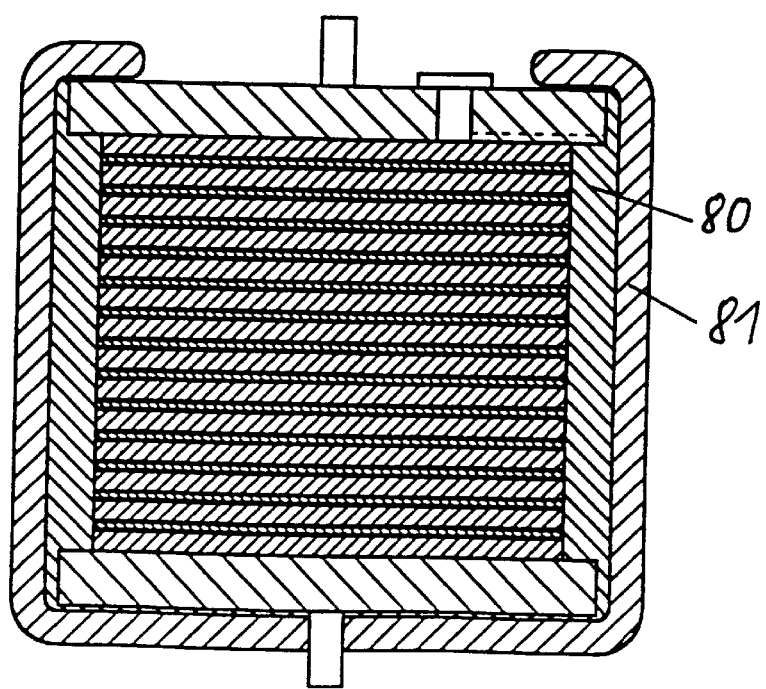
FIG. 8 shows a double-layer capacitor according to the invention using the stack design with a potting compound.

In another design (FIG. 7) the stack is placed in an electrically conducting metal tube or an insulating plastic tube 71. The contacts on the stack are formed by the electrically conducting flange plates. Thermal expansion is compensated by an electrically conducting mechanical buffer 70 so that corresponding compression and hence good contact are provided.

c) Potted design (FIG. 8)

The stack is placed in a casting mold (made of PTFE for example) with end flanges, and potted with a potting compound 80 (an epoxy resin/elastomer mixture for example). Potting compound 80 can simultaneously perform housing functions, with the electrical contacts being formed by end flanges. The stack is potted through openings that admit and discharge the potting compound. The method of embedding the stack using potting compound is especially advantageous for small DLCs that cannot be repaired economically.

Embodiment for the Housing

The housing performs protective functions. Contamination of the electrolytes and electrodes by the ambient atmosphere must be prevented. Heat must be carried away to ensure small temperature differentials between the interior of the cell and the environment.

The following designs have proven advantageous:

By increasing the surface of the housing (using ribs for example) the necessary conditions are created for good heat removal. For example, the flange can be made of materials that are good conductors (aluminum, graphite, etc.).

If necessary, gas overpressure protection can be integrated into the housing.

The housing components are surface-coated. The flange halves that are in direct contact with the stack and serve to provide electrical contact are provided with electrically conducting and corrosion-resistant layers. For example, the crimped housing is made of metallic material with an electrically insulating layer (polyamide for example).

Wound or Winding-Like DLC

A capacitor stack made by hot rolling (from two individual cells for example) is wound up in the form of a strip and integrated into a housing with electrical contacts. Advantageous winding designs are provided in the following embodiments:

a) Winding Design

Figure 9A:
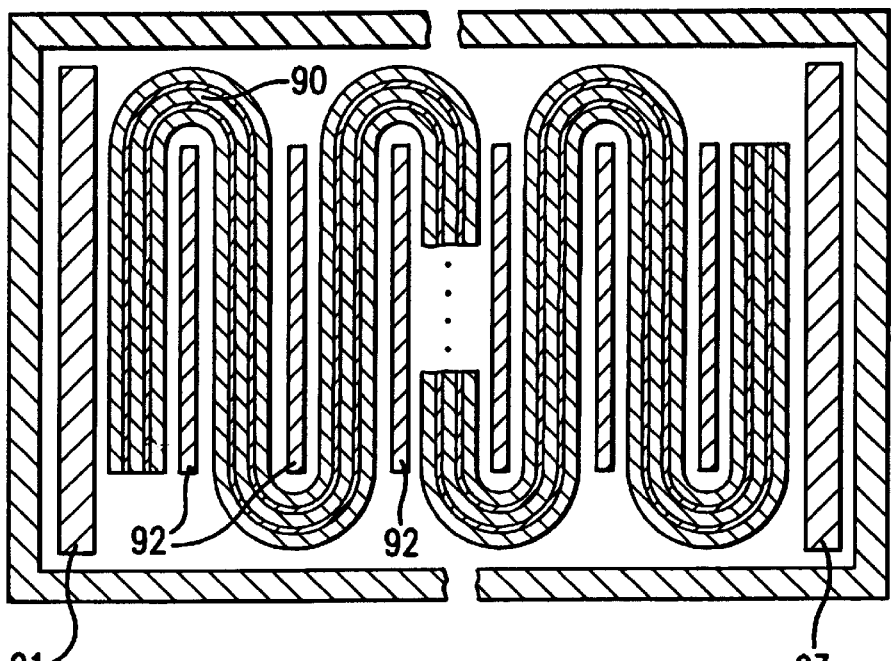
FIG. 9a is a top view a double-layer capacitor according to the invention with a loop design.
Figure 9B:
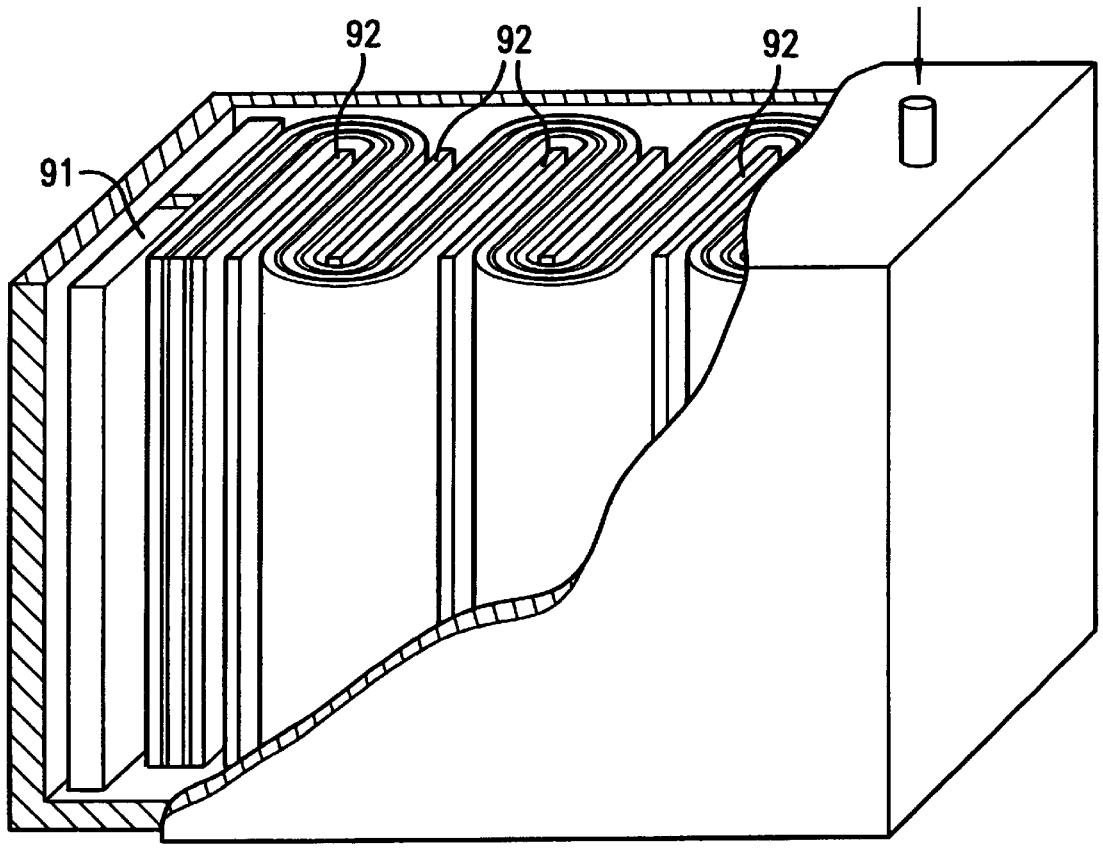

The winding is produced by rolling to form a spiral and then integrating it into a housing. The housing is then hermetically sealed.

b) Loop Design (FIGS. 9a and 9b)

Strip 90 is wound in the form of a loop, arc, or a winding course and compressed between two plates 91, 93. An insulating layer 92 (a plastic plate for example) inserted between the loops prevents short circuits between the turns and guarantees that the radii of curvature of the loops are constant. In advantageous embodiments, insulating layer 92 is also structured for example with channels that improve heat removal, even through the insulating layers.

Performance Data

Figure 10:
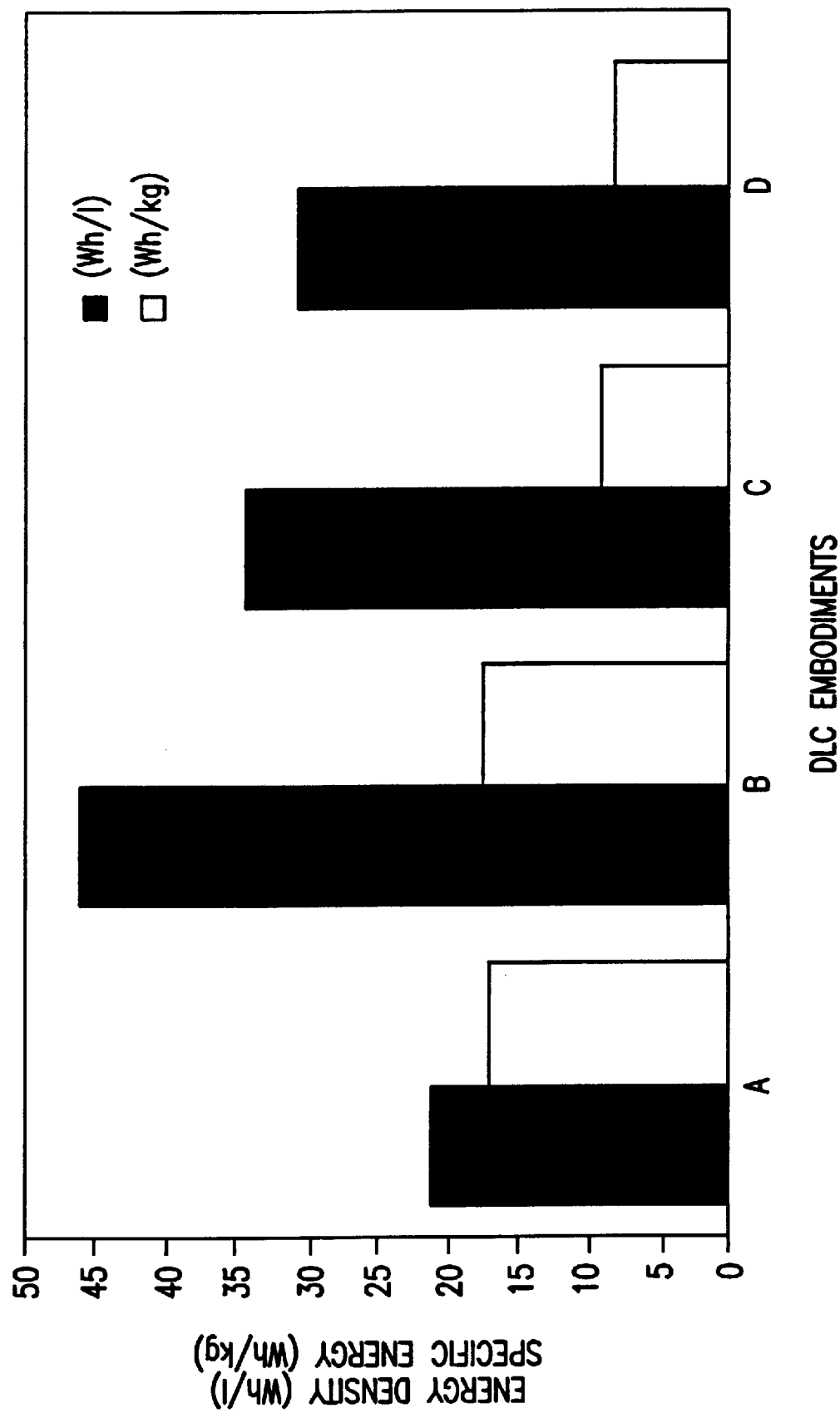
FIG. 10 is a graphic presentation of the performance data for several embodiments of the double-layer capacitor according to the invention.

Energy storage devices, such as power sources, etc., capable of high performance are produced with the DLC according to the invention. FIG. 10 shows the performance data (energy density and specific energy) achieved with the DLC embodiments A to D described above. It should be noted in this connection, however, that only the active bodies are included in the calculation.

Arrangement and Connection of DLCs

To construct DLCs economically, mass production is necessary. Adaptation to the required power level is then accomplished by connecting several DLCs together. DLCs with separate housings and/or DLCs without separate housings are placed in a housing and linked electrically. Basically, the number of DLCs with separate housings should be kept as small as possible since the housing contributes significantly to the total weight and volume.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A plural cell double-layer capacitor comprising a plurality of bipolar electrodes and ion-conducting electrolyte layers arranged alternately without additional intermediate layers, wherein:
   each bipolar electrode comprises an electrically conducting carrier with active layers applied on opposite sides thereof, said active layers having a low resistance and a large active surface;
   said carrier forms an, ion-conducting barrier between adjoining ones of said ion-conducting electrolyte layers;
   said bipolar electrodes and electrolyte layers form a permanent connection via an electrically conducting connecting layer which is provided to promote adhesion between said active layers of said bipolar electrodes and an adjacent one of said electrolyte layers.

2. Capacitor according to claim 1 wherein said connecting layer comprises a binder which is integrated into the active layers of the bipolar electrodes.

3. Capacitor according to claim 1 wherein said connecting layer is a separate layer arranged between said bipolar electrodes and said electrolyte layers.

4. Capacitor according to claim 1 wherein the electrolyte layers comprises a solid electrolyte.

5. Capacitor according to claim 4 wherein said solid electrolyte is a proton exchange membrane.

6. Capacitor according to claim 1 wherein said electrolyte layers comprises a pasty or gel-like material.

7. Capacitor according to claim 1 wherein the carrier comprises at least one dense or porous layer.

8. Capacitor according to claim 1 wherein the carrier is made of a material selected from the group consisting of flat metal foil, carbon foil, a porous metal material, and a porous carbon material.

9. Capacitor according to claim 8 wherein said porous material is one of a netting, a fabric, a fleece and a paper material.

10. Capacitor according to claim 1 wherein a gas-permeable spacer is provided in said electrolyte layers.

11. Capacitor according to claim 1 wherein said active layers comprise a hydrated, incompletely oxidized metal oxide powder.

12. Capacitor according to claim 1 wherein said active are applied to the carrier by means of a binder solution, whereby a solid bond is produced between said carrier layers and said active layers.

13. Capacitor according to claim 1 wherein said active layers contain carbon powder.

14. Capacitor according to claim 1 further comprising two flange plates which compress said plurality of bipolar electrodes and electrolyte layers of said capacitor.

15. Capacitor according to claim 1 wherein said bipolar electrodes and said electrolyte layers are integrated into a housing formed by one of a sleeve with a lid and a tube.

16. Capacitor according to claim 15 further comprising flange plates which are connected to the housing by crimping.

17. Capacitor according to claim 15 wherein an assembly composed of said electrodes and said electrolyte layers is potted in the housing.

18. Capacitor according to claim 16 wherein at least one of said flange plates and said housing has ribs to increase heat loss and mechanical stability.

19. Capacitor according to claim 16 wherein at least one of said flange plates and said housing is made of a conducting nonmetal.

20. Capacitor according to claim 16 wherein at least one of said flange plates and said housing comprises anti-corrosion layers.

21. Capacitor according to claim 16 wherein current is supplied and removed through one of said flange plates and said housing.

22. Capacitor according to claim 16 wherein at least one of said housing and said flange plates has a gas overpressure protective device having a predetermined breaking point.

23. Capacitor according to claim 1 wherein said electrodes and said electrolyte layers form one of: a spiral, a loop, and a winding course.

24. An energy storage device comprising a plural cell double-layer capacitor having a plurality of bipolar electrodes and ion-conducting electrolyte layers arranged alternately without additional intermediate layers, wherein:
   each bipolar electrode comprises an electrically conducting carrier with active layers applied on opposite sides thereof, said active layers having a low resistance and a large active surface;
   said carrier forms an ion-conducting barrier between adjoining ones of said ion-conducting electrolyte layers;
   said bipolar electrodes and said electrolyte layers form a permanent connection via an electrically conducting connecting layer which is provided to promote adhesion between said active layers of said bipolar electrodes and an adjacent one of said electrolyte layers.

25. A power source comprising a plurality of bipolar electrodes and ion-conducting electrolyte layers arranged alternately without additional intermediate layers, wherein:
   each bipolar electrode comprises an electrically conducting carrier with active layers applied on opposite sides thereof, said active layers having a low resistance and a large active surface;
   said carrier forms an ion-conducting barrier between adjoining ones of said ion-conducting electrolyte layers;
   said bipolar electrodes and said electrolyte layers form a permanent connection via an electrically conducting connecting layer which is provided to promote adhesion between said active layers of said bipolar electrodes and an adjacent one of said electrolyte layers.

* * * * *